Figures 1, 2, 3:
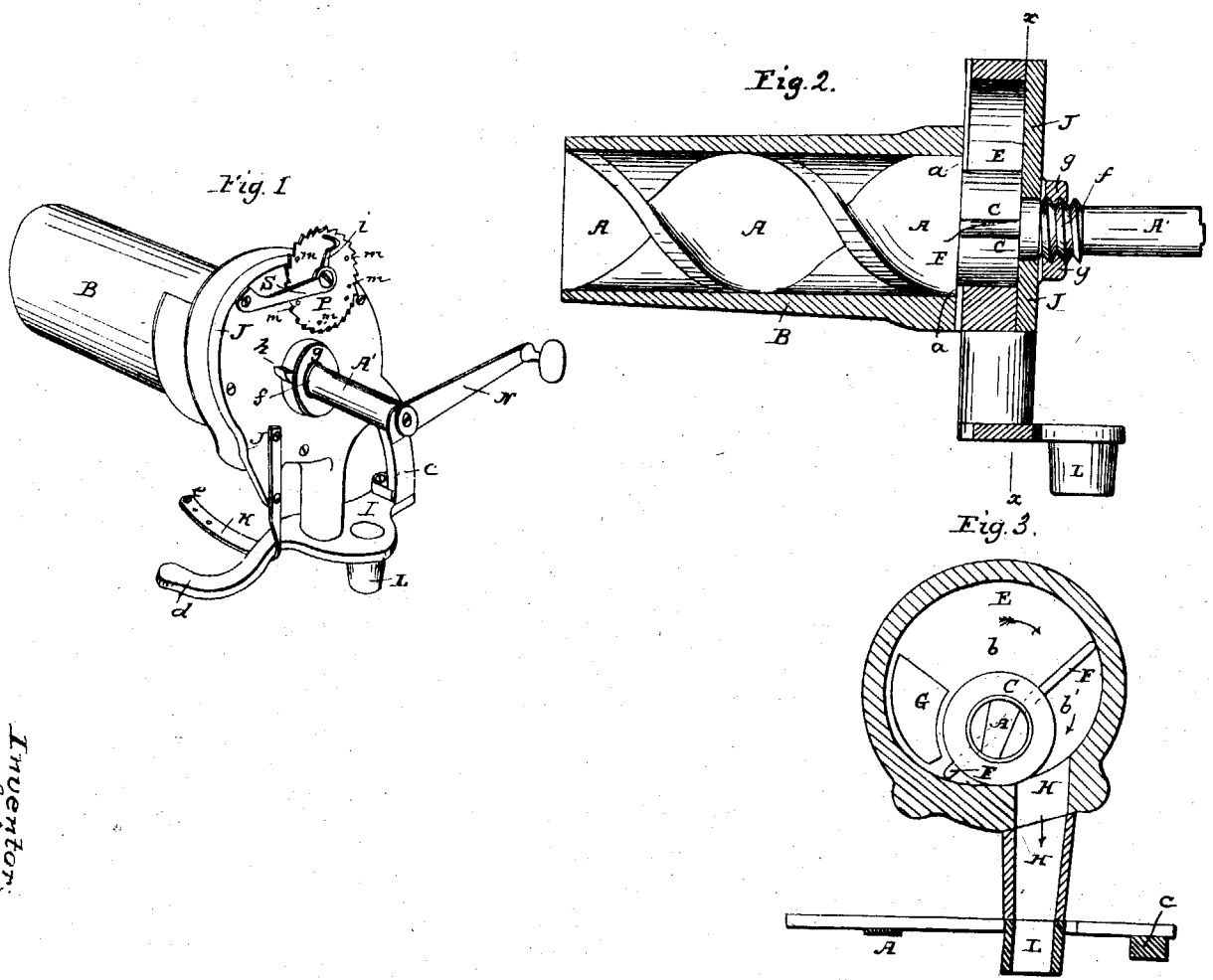

I. KINMAN.

Measuring Faucet.

No. 1,148.

Reissued March 5, 1861.

Inventor:
Ira Kinman

UNITED STATES PATENT OFFICE.

IRA KINMAN, OF FREEPORT, ILLINOIS.

IMPROVEMENT IN MEASURING-FAUCETS.

Specification forming part of Letters Patent No. 23,845, dated May 3, 1859; Reissue No. 1,148, dated March 5, 1861.

*To all whom it may concern:*

Be it known that I, IRA KINMAN, of Freeport, in the county of Stephenson and State of Illinois, have invented certain new and useful improvements in Measuring-Faucets; and I do hereby declare that the following is a full, clear and exact description thereof, reference being had to the accompanying drawings, making a part of this specification, in which—

Figure 1 is a perspective view of the faucet, showing the exterior of the same. Fig. 2 represents a longitudinal section through the faucet, showing the interior of the same. Fig. 3 is a transverse section taken through the red line *x x*, Fig. 2, showing a front view of the interior of the eccentric-cylinder and the manner of discharging the liquid therefrom.

Similar letters of reference indicate corresponding parts in the three figures.

To enable those skilled in the art to make and use my invention, I will proceed to describe its construction and operation.

The faucet about to be described is to be cast of iron or other suitable metal. It is provided with an endless screw or conveyer, A, which is packed or ground water-tight to the inside of the hollow tube or cylinder B. This screw A terminates in a barrel, C, which passes through a division, *a*, into an eccentric-chamber, E, (shown clearly in Fig. 3,) where it receives a slide, F, which slide fits water-tight within this chamber, and moves back and forth through its barrel C as the screw A is revolved, the barrel C being set out of a true center with the elliptical chamber E. The ends of the slide fit or touch the inner surfaces of the chamber during its full revolution, dividing the chamber E into two parts, *b b'*, and forming rotary pistons, which alternately draw the liquor into chamber E through the opening G and force it out through the discharge-aperture H in the direction indicated by the arrows in Fig. 3. The discharge through the aperture H is regulated by a gate, I, one end of which is pivoted to an arm, C, which projects down from the cap J of chamber E, and passes under the nozzle of the discharge-opening H, and rests on a curved support, K. The gate terminates in a handle, *d*.

The upper surface of this gate I is ground so as to fit tight against the under surface of the nozzle H and prevent leakage.

L is a small tube or funnel projecting down from the gate I, so arranged that it can be brought under the nozzle H, or partially under this nozzle, so as to regulate the flow of liquid through the nozzle. The quantity of liquid to be thus discharged is regulated by a stop-pin, *e*, on the curved support K.

A' is a stem, cast with the barrel C and screw A, which passes through the face or cap-plate J of chamber E, and projects from it a suitable distance. To this stem is secured the crank N, for giving motion to the screw A and slide F. This stem A' has a reverse-screw, *f*, which receives a nut, *g*, that keeps the parts firmly together. The nut *g* turns with stem A', and it has a small lug, *h*, projecting from its periphery, which operates a register-wheel, P, so as to move it the distance of one tooth at each revolution of the lug. This register-wheel is provided with a certain number of teeth, which are regularly spaced off, and upon the face of this wheel are a number of perforations, *m m m*, into which is placed the point of hand *i*. This index-hand *i* turns with the wheel P until it comes in contact with stop S, where it remains and checks the motion of the crank N, when it is set back to another hole, indicating the amount of liquor to again be drawn.

The operation is as follows: The cylinder B is screwed into a tap in the reservoir. The gate I is then opened by bringing the funnel L under the nozzle H. The point of the index-hand *i* is set into one of the perforations *m*, indicating the quantity of liquid to be drawn. The crank N is then turned from left to right, rotating the screw A, and drawing the liquid from the reservoir through opening G into the chamber E, from whence it is forced down in a continuous stream through discharge-pipe H by the slide F into a vessel for receiving it. This operation is repeated until the index-hand comes in contact with the stop S, which prevents the further motion of crank N.

The screw A is to be used especially for thick, viscous liquids—such as oil, treacle, &c.—for facilitating the flow through the tube B into the cylinder E, and this screw may be dispensed with for drawing thin liquids through the faucet.

Having thus described my invention, what I claim as new, and desire to secure by Letters Patent, is—

1. The construction of the faucet with a rotating slide, F, and an eccentric-barrel, C, operating, substantially as herein shown and described, in combination with the described device to register accurately and automatically the number of the rotations of the slide and to arrest it when the desired quantity of fluid is discharged, as set forth.

2. The employment of an endless screw, in combination with the rotating slide F and eccentric-chamber E, arranged and operating in the manner and for the purposes substantially as set forth.

IRA KINMAN.

Witnesses:
JAMES S. COCHRAN,
Z. C. COCHRAN.